United States Patent
Hasan et al.

(10) Patent No.: US 10,337,930 B2
(45) Date of Patent: Jul. 2, 2019

(54) ONLINE IGBT JUNCTION TEMPERATURE ESTIMATION WITHOUT THE USE OF A DEDICATED TEMPERATURE ESTIMATION OR MEASUREMENT DEVICE

(71) Applicant: GM Global Technology Operations LLC, Detroit, MI (US)

(72) Inventors: S. M. Nayeem Hasan, Novi, MI (US); Bryan M. Ludwig, West Bloomfield, MI (US); David P. Tasky, Farmington Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 519 days.

(21) Appl. No.: 14/709,782

(22) Filed: May 12, 2015

(65) Prior Publication Data

US 2016/0334280 A1 Nov. 17, 2016

(51) Int. Cl.
  *G01K 7/01* (2006.01)
  *H01L 29/739* (2006.01)
  *G01K 7/42* (2006.01)

(52) U.S. Cl.
  CPC .............. *G01K 7/01* (2013.01); *G01K 7/427* (2013.01); *H01L 29/7397* (2013.01); *G01K 2217/00* (2013.01)

(58) Field of Classification Search
  CPC ............ G01K 7/00; G01K 7/01; G01K 7/427; G01K 2217/00; H01L 29/66333; H01L 29/66325; H01L 29/7393; H01L 29/7395; H01L 2924/13055; H01L 27/0664; H01L 29/7397

(Continued)

(56) References Cited

U.S. PATENT DOCUMENTS

| | | | | |
|---|---|---|---|---|
| 5,875,414 | A | * 2/1999 | Tsutsumi | H02M 1/32 702/130 |
| 2014/0312704 | A1 | * 10/2014 | Mayor Lusarreta | H02M 1/32 307/82 |
| 2016/0252402 | A1 | * 9/2016 | Singh | G01K 7/42 702/130 |

OTHER PUBLICATIONS

Li Ran et al., Monitoring Solder Fatigue in a Power Module Using Case-Above-Ambient Temperature Rise, Nov./Dec. 2011, IEEE Transactions on Industry Applications, vol. 47, No. 6.*

(Continued)

*Primary Examiner* — Alexander Sofocleous
*Assistant Examiner* — Alfredo Bermudez Lozada
(74) *Attorney, Agent, or Firm* — Cantor Colburn LLP

(57) ABSTRACT

A number of variations may include a method which may include determining a temperature rise in an IGBT junction without the use of a temperature estimation or measurement device because determination may be made by first determining the power loss due to the conduction losses of the IGBT and power loss associated with switching the IGBT where these losses may be determined by utilizing the saturation voltage of the IGBT, IGBT PWM duty cycle, IGBT switching frequency, fundamental frequency along with a lookup table for the switching energies and the phase current going through the IGBT. The determined power loss may be multiplied by a measured, sensed or obtained thermal impedance from the IGBT junction. Finally, the determined temperature rise of the IGBT junction may be added to a measured, sensed or obtained temperature of the coolant in order to determine the absolute temperature of the IGBT junction.

17 Claims, 3 Drawing Sheets

(58) Field of Classification Search
USPC .......................................................... 702/130
See application file for complete search history.

(56) References Cited

OTHER PUBLICATIONS

Kim et al., On-Line Estimation of IGBT Junction Temperature Using On-State Voltage Drop, 1998, IEEE.*

* cited by examiner

ONLINE IGBT JUNCTION TEMPERATURE ESTIMATION WITHOUT THE USE OF A DEDICATED TEMPERATURE ESTIMATION OR MEASUREMENT DEVICE

TECHNICAL FIELD

The field to which the disclosure generally relates to includes measuring systems including temperature measuring systems.

BACKGROUND

Measuring systems may include various temperature measuring systems.

SUMMARY OF ILLUSTRATIVE VARIATIONS

A number of variations may include a method which may include determining a temperature rise in an IGBT junction without the use of a dedicated temperature estimation or measurement device by determining the total power loss of the IGBT due to the conduction and the switching of the IGBT. By multiplying the determined power loss by a measured, sensed or obtained thermal impedance from the IGBT junction to a coolant and thereafter adding the determined temperature rise of the IGBT junction to a measured, sensed or obtained temperature of the coolant the absolute temperature of the IGBT junction is determined.

A number of other variations may include a method which may determine a temperature rise in an IGBT junction without the use of a dedicated temperature estimation or measurement device by determining the total power loss of the IGBT due to the conduction and the switching of the IGBT. The determined power loss may be multiplied by a measured, sensed or obtained thermal impedance from the IGBT junction to a coolant. Additionally, the determined temperature rise of the IGBT junction may be added to a measured, sensed or obtained temperature of the coolant in order to determine the absolute temperature of the IGBT junction. Additionally, the determination of power loss due to the conduction loss of the IGBT, P_conduction, may also be determined by the sum of the product of the measured phase current of the IGBT junction, Ip, measured saturation voltage of the IGBT junction, Vce_sat, and duty cycle of the IGBT PWM (pulse width modulation), D, which may be divided by the switching frequency, Fsw, for each switching event for half of the fundamental period (each IGBT may conduct for approximately 180° of the fundamental frequency). This determines the power losses over the fundamental period. It may be multiplied by the fundamental frequency of the motor signal, F_fundamental, to determine total IGBT conduction losses where n equals Fsw divided by F_fundamental where Fsw is the IGBT switching frequency and the summation is taken from 1 to n over the fundamental period and if Ip(n) is going through the diode, use Ip(n)=0.

$$P\_conduction = \sum \frac{Ip(n) * Vce_{sat(n)} * D(n)}{Fsw} * F\_fundamental.$$

Yet another variation may include a method of determining a temperature rise in an IGBT junction without the use of the dedicated temperature estimation or measurement device by determining the power loss due the conduction and the switching of the IGBT which may include multiplying the determined power loss by a measured, sensed, or obtained thermal impedance from the IGBT junction to a coolant. Additionally, the determined temperature rise of the IGBT junction is added to a measured, sensed or obtained temperature of the coolant which may determine the absolute temperature of the IGBT junction.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

The following description of the variations is merely illustrative in nature and is in no way intended to limit the scope of the invention, its application, or uses.

Figure 1:
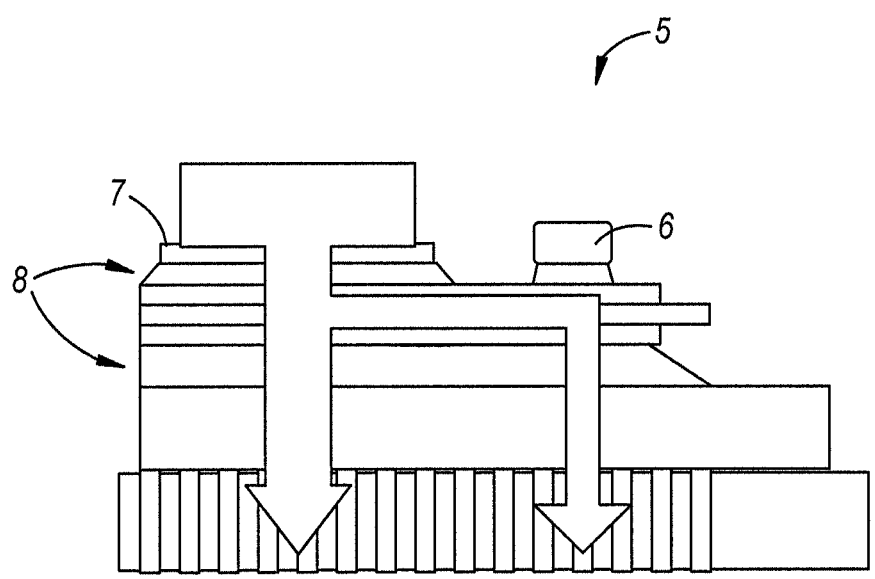
FIG. 1 illustrates a schematic representation of a prior art temperature measuring system.

Referring now to FIG. 1, FIG. 1 shows a prior art version of a temperature measuring or estimation system 5. In the prior art system 5, as illustrated in FIG. 1, a thermistor 6 may be disposed close to the IGBT junction and may be constructed and arranged to determine the temperature of the IGBT junction. Referring again to the variation illustrated in FIG. 1, an IGBT die 7 may be provided, along with a solder 8. It is additionally contemplated that the arrows in FIG. 1 represent heat flow. However, in the variation illustrated in FIG. 1, due to solder delamination of the thermistor, the temperature reading could be inaccurate by up to approximately 30 degrees. This error in temperature may result in a false loss of coolant detection and may derate the torque which may produce negative consequences such as stopping the vehicle or other negative consequences as known by one of ordinary skill in the art.

Figure 2:
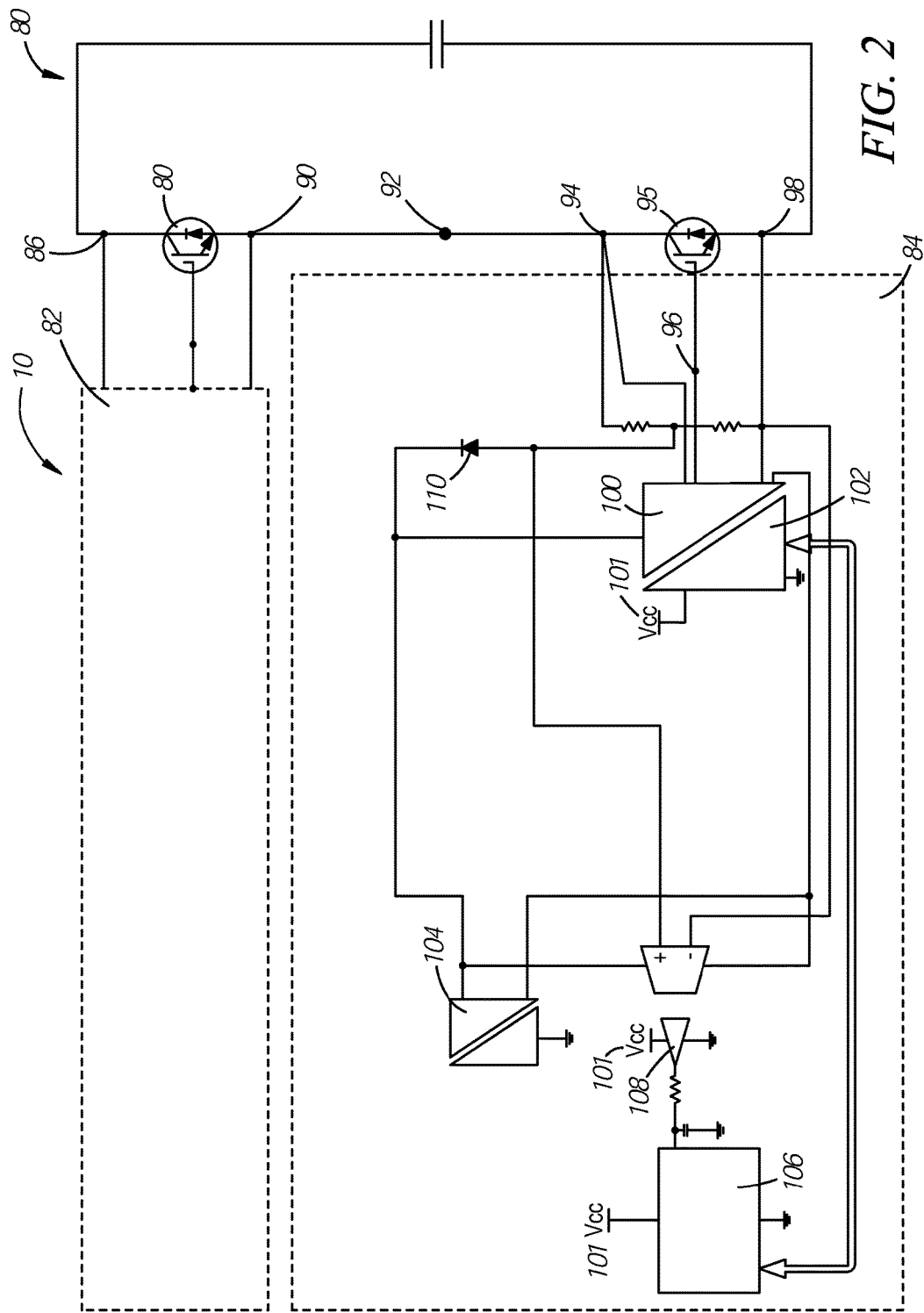
FIG. 2 illustrates a schematic representation of a temperature measuring system according to one variation of the present invention where IGBT junction saturation voltage, Vce_sat, during on state may be measured using a simple sensing circuit.
Figure 3:
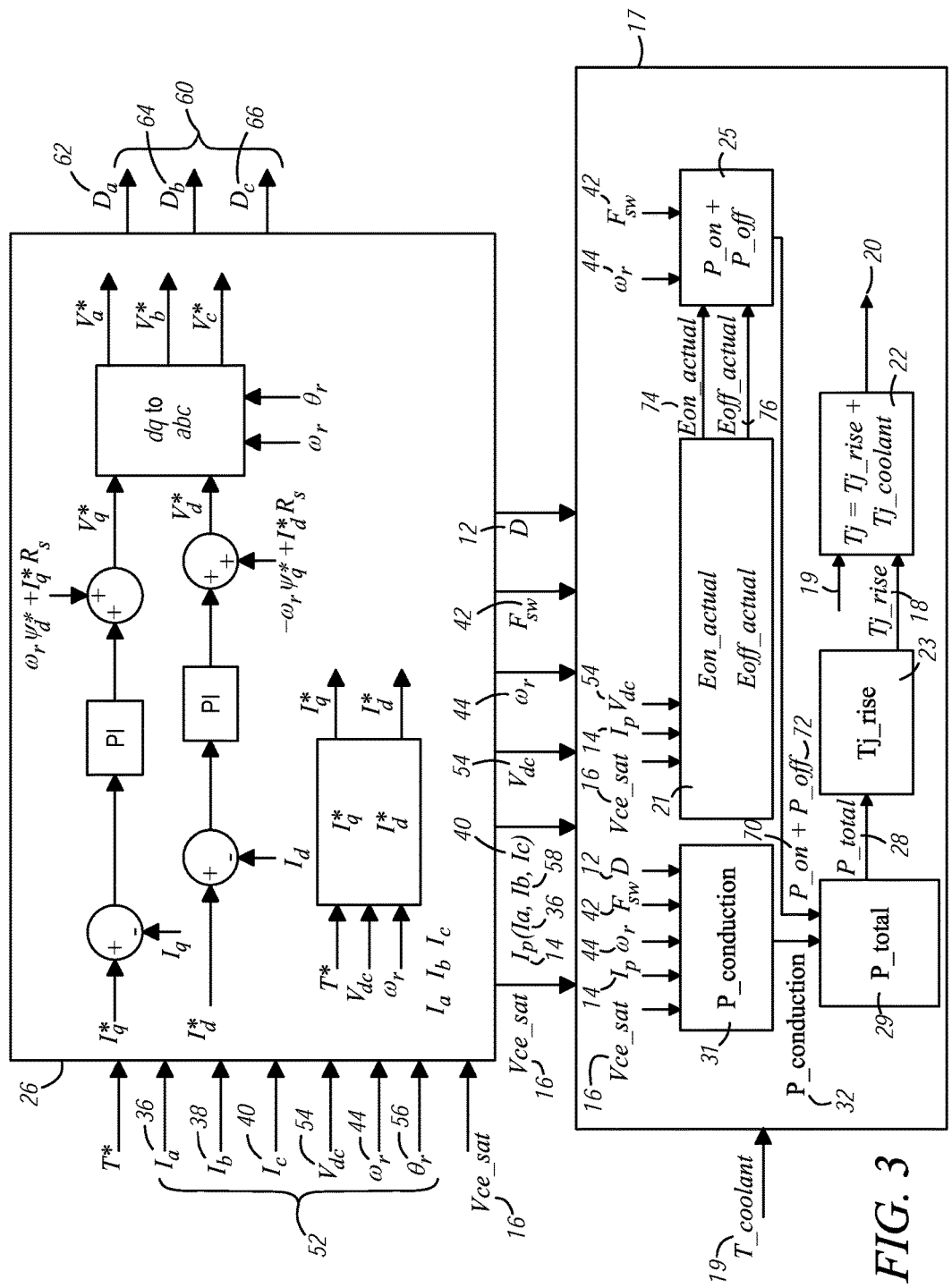
FIG. 3 illustrates IGBT junction temperature estimation algorithm flow chart block diagram according to another variation of the present invention.

Referring now to the variations illustrated in FIGS. 2 and 3, according to one variation of the present invention, an IGBT junction temperature may be determined or estimated without the use of a thermistor, or other temperature sensing device. According to one variation of the present invention determining a temperature in an IGBT junction without the use of a dedicated temperature estimation or measurement device may be done by determining any power loss, which may be due to the conduction and the switching of the IGBT, then multiplying the determined power loss by a thermal impedance from the IGBT junction and then adding the determined temperature rise of the IGBT junction to a temperature of the coolant in order to determine the absolute temperature of the IGBT junction. Both the thermal impedance from the IGBT junction and the temperature of the coolant may be measured, sensed, obtained, or determined as known by one of ordinary skill in the art.

In a number of illustrative variations, an electro-mechanical drive system 10 shown in FIG. 2 may be provided which may include an inverter comprising at least one of an insulated-gate bipolar transistor (IGBT). In FIG. 2, reference numeral 84 may represent the IGBT saturation voltage Vce_sat sensing circuit of the lower side IGBT 95 of one of the phases of the inverter. Similar circuit may be implemented for other phases of the inverter as well to estimate the IGBT junction temperature of the other phases. A resistor voltage divider may be used across collector 94 and emitter 98 of the IGBT 95 to sense the IGBT saturation voltage Vce_sat. The resistors' values of the voltage divider may be chosen such that the isolation of the inverter may be maintained. The output of the voltage divider may be fed in to an isolation amplifier with high input impedance 108. The output of the isolation amplifier 108 may be fed in to one of the analog channels of the microprocessor 106. The high voltage side of the isolation amplifier 108 may be supplied from gate drive isolated power supply 104. The low voltage side of the isolation amplifier 108 may be supplied from microprocessor analog channel power supply 101. A high voltage ultra-high speed low capacitance diode 110 may be used to clamp the isolation amplifier's 108 input voltage to its rail voltage during off-state of the IGBT 95. In FIG. 2, reference numeral 100 may represent isolated gate drive electronics that may drive the gate 96 of the IGBT 95, and reference numeral 102 may represent gate drive control and fault reporting electronics. System 82 may represent a gate drive circuit (no Vce_Sat sensing circuit) of upper side IGBT 80. The system 82 may also include a represent collector 86 and an emitter 90 of upper side IGBT 80.

In a number of illustrative variations, an IGBT may switch between an on and off state, conducting electricity according to an oscillating electrical signal having a regular frequency. Over the course of these switching events, or at each switching event, a number of system properties or variables may be, sensed, measured, obtained or determined. Some of such system properties or variables may include but are not limited to the duty cycle of a signal to the motor, a resulting phase current, or a saturation voltage of the IGBT. Sensing, measuring, obtaining or determining a system property may be deliberately delayed after a switching event to obtain a steady state signal, to substantially avoid an inaccurate measurement, or to avoid other issues which may be associated with switching in electronics.

In a number of variations as illustrated in FIG. 3, a system 26 may represent an electro-mechanical drive system controller where phase currents Ia 36, Ib 38, Ic 40, high voltage DC (HVDC) bus voltage Vdc 54, motor speed $\omega_r$ 44, motor angular position $\theta_r$ 56 and IGBT junction saturation voltage Vce_sat 16 may be feedback signals. System 17 may represent an IGBT junction temperature estimation algorithm where the inputs may be IGBT junction saturation voltage Vce_sat 16, phase current Ip (Ia, Ib, Ic) 14, HVDC bus voltage Vdc 54, motor speed $\omega_r$ 44, IGBT switching frequency $F_{sw}$ 42, IGBT PWM (pulse width modulation) duty cycle D 12 coming from the controller 26, and coolant temperature T_coolant 19.

In a number of illustrative variations, calculations may be made for the determination or prediction of certain other system properties or variables which are not measured, sensed, or obtained. In a number of illustrative variations, such calculations may be based at least upon previously or presently sensed, measured, determined, or obtained system properties or variables.

In a number of illustrative variations, sensing may regularly take place at faster intervals than calculation and data processing. It is contemplated that at least saturation voltage of the IGBT may be measured in every switching period. Moreover, data processing and calculation may be done in a slower loop in order to not burden the microprocessor.

Measurements may be taken approximately 15-20 micro seconds after the IGBT is turned on in order to provide a steady state reading. Additionally, any sensed, measured, obtained or determined data including but not limited to system properties or variables may be correlated to data including but not limited to a particular time frame, system property, or variable and stored in data objects including but not limited to a lookup table, map, array, or any data object known in the art, for use in prediction or determination of other system properties or variables. Such a lookup table may be provided, obtained, or generated.

In a number of illustrative variations, an IGBT junction temperature may be estimated by determining a temperature rise in the IGBT junction, and using the determined temperature rise to determine the absolute temperature of the IGBT junction by accounting for the temperature of a coolant which may be used in conjunction with the IGBT junction temperature rise. Specifically, in a number of illustrative variations, the absolute temperature, Tj 20, of the IGBT junction may be estimated in the system 22, see for example FIG. 3, by adding the temperature of the coolant, T_coolant 19, to the determined rise in IGBT temperature, Tj_rise 18:

$$Tj = Tj\_rise + T\_coolant$$

where Tj_rise 18 may be determined without the use of a dedicated temperature estimation or measurement device, and where T_coolant 19 may be provided by any number of components including but not limited to a controller or a sensor.

In a number of illustrative variations, the determination of a rise in IGBT temperature, Tj_rise 18 in the system 23 as illustrated in FIG. 3, may involve determining the power loss in the IGBT, P_total 28; determining the thermal impedance from the IGBT junction to a coolant, Rth; and multiplying the determined power loss P_total 28 by the determined or obtained thermal impedance Rth:

$$Tj\_rise = P\_total * Rth$$

where P_total and Rth may be provided by any number of components including but not limited to a controller or a sensor, or determined deliberately based upon other system properties or variables.

In a number of illustrative variations, determining the total power loss in the IGBT, P_total 28, as illustrated in the system 29 of FIG. 3, may involve determining an amount of power lost due to conduction loss of the IGBT, P_conduction 32; determining an amount of power lost due to switching loss of the IGBT, P_switching 70, 72; and adding the conduction loss, P_conduction, and switching loss, P_switching, together:

$$P\_total = P\_conduction + P\_switching.$$

In a number of illustrative variations, an amount of power lost due to conduction loss of the IGBT, P_conduction 32, may be determined in the system 31 as shown in FIG. 3 by the sum of the product of the phase current of the corresponding IGBT junction, Ip (Ia or Ib or Ic), saturation voltage of the IGBT junction, Vce_sat, and duty cycle of the IGBT PWM, D, divided by the switching frequency of the IGBT, Fsw, for each switching event for half of the fundamental cycle (each IGBT conducts for 180° of the fundamental frequency), multiplied by the fundamental frequency of the motor signal, F_fundamental, where n equals Fsw divided by F_fundamental and the summation is taken from 1 to n over the fundamental period, and if Ip(n) is going through the diode, use Ip(n)=0. The inputs of the system 31 may be saturation voltage of the IGBT junction Vce_sat 16, phase current Ip 14, motor speed $\omega_r$ 44, switching frequency Fsw 42, and duty cycle of the IGBT PWM D 12.

$$P\_conduction = \sum \frac{Ip(n) * Vce_{sat(n)} * D(n)}{Fsw} * F\_fundamental$$

where the phase current of the IGBT junction, Ic, saturation voltage of the IGBT junction, Vce_sat, duty cycle of the IGBT PWM, D, the switching frequency, Fsw, and the fundamental frequency of the motor signal may be provided by any number of components including but not limited to a controller or a sensor. For example, in a number of illustrative variants, the fundamental frequency of the motor signal, F_fundamental, may be calculated by dividing the product of the motor pole pairs (number of motor poles divided by 2) and the synchronous speed, Ns, of the motor in RPM (revolution per minute) by 60 for a three-phase motor:

$$F\_fundamental = \frac{no.\ of\ poles}{2} * \frac{Ns}{60}.$$

In a number of illustrative variations, an amount of power lost due to the switching loss of the IGBT, P_switching, may be determined in the system 25 as illustrated in FIG. 3 for a corresponding phase current, HVDC bus voltage, fundamental frequency and switching frequency. The inputs for the system 25 may be switching on energy Eon_actual 74, switching off energy Eoff_actual 76, motor speed $\omega_r$ 44 and switching frequency $F_{sw}$ 42. More specifically, P_switching may be determined by the sum of power loss due to switching transients, or other power losses associated with switching, during the turn-on switching event, P_on 70, and the power lost due to transients, or other power losses associated with switching, during the turn-off switching event of the IGBT, P_off 72:

*P*_switching=*P*_on+*P*_off.

P_on 70 may be determined by summing the actual energy of the IGBT turn-on switching for each switching event, Eon_actual 74, and multiplying that sum by the fundamental frequency of the motor signal, F_fundamental, where n equals Fsw divided by F_fundamental where Fsw is the switching frequency and the summation is taken from 1 to n over the fundamental period and if the phase current Ip(n) is going through the diode, use Eon_actual(n)=0::

*P*_on=Σ*E*on_actual(*n*)\**F*_fudamental where the actual energy of the IGBT turn-on switching, Eon_actual, may be determined by multiplying the energy during the turn-on switching event of the IGBT as provided by a lookup table, Eon_lookup_table, by the quotient of the measured HVDC bus voltage, HVDC_measured, and the HVDC bus voltage, as provided by the lookup table to which Eon_lookup_table corresponds, HVDC_lookup.Eon_lookup_table and Eon_actual may be calculated in the system 21 of FIG. 3. The inputs for the system 21 may be IGBT saturation voltage Vce_sat 16, phase current Ip (Ia, Ib, Ic) 14, HVDC bus voltage 54. The lookup table may be a 2-D lookup table created off-line where the switch on energy Eon_lookup_may be a function of the phase current Ip and IGBT saturation voltage Vce_sat. The off-line lookup table may be created for a certain HVDC bus voltage which may be called HVDC_lookup. In every switching event, Eon_lookup_table may be determined from the lookup table depending on measured phase current of the corresponding IGBT junction Ip and measured IGBT saturation voltage Vce_sat. It is also contemplated that the lookup table may be any other type of lookup table as known by one of ordinary skill in the art. Eon_actual may be calculated as follows:

$$Eon\_actual = Eon\_lookup\_table * \frac{HVDC\_measured}{HVDC\_lookup}.$$

P_off may be determined by summing the actual energy of the IGBT turn-off switching for each switching event, Eoff_actual, and multiplying that sum by the fundamental frequency of the motor signal, F_fundamental, where n equals Fsw divided by F_fundamental where Fsw may be the IGBT switching frequency and the summation is taken from 1 to n over the fundamental period and if Ic(n) is going through the diode, use Eoff_actual(n)=0:

*P*_off=Σ*E*off_actual(*n*)\**F*_fundamental where the actual energy of the IGBT turn-off switching, Eoff_actual, may be determined by multiplying the energy of the turn-off switching event of the IGBT as provided by a lookup table, Eoff_lookup_table, by the quotient of the measured HVDC bus voltage, HVDC_measured, and the HVDC bus voltage, as provided by the lookup table to which Eoff_lookup_table corresponds, HVDC_lookup. Eoff_lookup_table and Eoff_actual may be calculated in the system 21 as illustrated in FIG. 3. The lookup table may be a 2-D lookup table created off-line where the switch on energy Eoff_lookup_table may be a function of the phase current Ip and IGBT saturation voltage Vce_sat. The off-line lookup table may be created for a certain HVDC bus voltage which is called HVDC_lookup. In every switching event, Eoff_lookup_table may be determined from the lookup table depending on measured phase current of the corresponding IGBT junction Ip and measured IGBT saturation voltage Vce_sat. It is also contemplated that the lookup table may be any other type of lookup table as known by one of ordinary skill in the art. Eoff_actual may be calculated as follows:

$$Eoff\_actual = Eoff\_lookup\_table * \frac{HVDC\_measured}{HVDC\_lookup}.$$

The following description of variants is only illustrative of components, elements, acts, products and methods considered to be within the scope of the invention and are not in any way intended to limit such scope by what is specifically disclosed or not expressly set forth. The components, elements, acts, products and methods as described herein may be combined and rearranged other than as expressly described herein and still are considered to be within the scope of the invention.

Variation 1 may include a method comprising, first determining a temperature rise in an IGBT junction without the use of a dedicated temperature estimation or measurement device by determining the power loss due to loss of the conduction and the switching of the IGBT; then multiplying the determined power loss by a measured, sensed or obtained thermal impedance from the IGBT junction to a coolant; and finally adding the determined temperature rise of the IGBT junction to a measured, sense or obtained temperature of the coolant to determine the absolute temperature of the IGBT junction.

Variation 2 may include a method as set forth in variation 1 wherein the determination of power loss due to conduction loss of the IGBT, P_conduction, is determined by the sum of the product of the phase current of the corresponding IGBT junction, Ip, saturation voltage of the IGBT junction, Vce_sat, and duty cycle of the IGBT PWM, D, divided by the switching frequency, Fsw, for each switching event for half of the fundamental cycle, multiplied by the fundamental frequency of the motor signal, F_fundamental, where n equals Fsw divided by F_fundamental where the summation is taken from 1 to n over the fundamental period, and if Ip(n) is going through the diode, use Ip(n)=0:

$$\text{P\_conduction} = \sum \frac{Ip(n) * Vce_{sat(n)} * D(n)}{Fsw} * \text{F\_fundamental}$$

where the phase current of the IGBT junction, ic, saturation voltage of the IGBT junction, Vce_sat, duty cycle of the IGBT PWM, D, the switching frequency, Fsw, and the fundamental frequency of the motor signal is be provided by any number of components including but not limited to a controller or a sensor.

Variation 3 may include a method as set forth in any of variations 1 or 2 wherein an amount of power loss due to switching loss of the IGBT, P_switching, is determined by the sum of power loss due to switching transients, or other losses associated with switching, during the turn-on of the IGBT, P_on, and the power loss due to switching transients, or other losses associated with switching, during turn-off of the IGBT, P_off:

$$P\_switching = P\_on + P\_off.$$

Variation 4 may include a method as set forth in any of variations 1-3 wherein P_on is determined by summing the actual energy of the IGBT turn-on switching for each switching event, Eon_actual, and multiplying that sum by the fundamental frequency of the motor signal, F_fundamental, where n equals Fsw divided by F_fundamental where Fsw is the switching frequency and where the summation is taken from 1 to n over the fundamental period and if the phase current Ip(n) is going through the diode, use Eon_actual(n)=0:

$$P\_on = \Sigma Eon\_actual(n) * F\_fudamental.$$

where the actual energy of the IGBT turn-on switching event, Eon_actual, is determined by multiplying the energy of the IGBT turn-on switching event as provided by a lookup table, Eon_lookup_table, by the quotient of the measured HVDC bus voltage, HVDC_measured, and the HVDC bus voltage, as provided by the lookup table to which Eon_lookup_table corresponds, HVDC_lookup:

$$\text{Eon\_actual} = \text{Eon\_lookup\_table} * \frac{\text{HVDC\_measured}}{\text{HVDC\_lookup}}.$$

Variation 5 may include a method as set forth in any of variations 1-4 wherein P_off is determined by summing the actual energy of the IGBT turn-off switching event for each switching event, Eoff_actual, and multiplying that sum by the fundamental frequency of the motor signal, F_fundamental, where n equals Fsw divided by F_fundamental where Fsw is the switching frequency and where the summation is taken from 1 to n over the fundamental period and if the phase current Ip(n) is going through the diode, use Eoff_actual(n)=0:

$$P\_off = \Sigma Eoff\_actual(n) * F\_fundamental$$

where the actual energy of the off state of the IGBT, Eoff_actual, is determined by multiplying the energy of the IGBT turn-off switching event as provided by a lookup table, Eoff_lookup_table, by the quotient of the measured HVDC bus voltage, HVDC_measured, and the HVDC bus voltage, as provided by the lookup table to which Eoff_lookup_table corresponds, HVDC_lookup:

$$\text{Eoff\_actual} = \text{Eoff\_lookup\_table} * \frac{\text{HVDC\_measured}}{\text{HVDC\_lookup}}.$$

Variation 6 may include a method which may include determining a temperature rise in an IGBT junction without the use of a dedicated temperature estimation or measurement device by determining the power lost due to loss of the conduction and the switching of the IGBT. Multiplying the determined power loss by a measured, sensed or obtained thermal impedance from the IGBT junction to a coolant. Finally, adding the determined temperature rise of the IGBT junction to a measured, sense or obtained temperature of the coolant to determine the absolute temperature of the IGBT junction. The determination of power loss due to conduction loss of the IGBT, P_conduction, is determined by the sum of the product of the phase current of the corresponding IGBT junction, Ip, saturation voltage of the IGBT junction, Vce_sat, and duty cycle of the IGBT PWM, D, divided by the IGBT switching frequency, Fsw, for each switching event for half of the fundamental cycle, multiplied by the fundamental frequency of the motor signal, F_fundamental, where n equals Fsw divided by F_fundamental and the summation is taken from 1 to n over the fundamental period, and if Ip(n) is going through the diode, use Ip(n)=0:

$$\text{P\_conduction} = \sum \frac{Ip(n) * Vce_{sat(n)} * D(n)}{Fsw} * \text{F\_fundamental}.$$

Variation 7 may include the method as set forth in variation 6 wherein the phase current of the IGBT junction, Ic, saturation voltage of the IGBT junction, Vce_sat, duty cycle of the IGBT junction, D, the switching frequency, Fsw, and the fundamental frequency of the motor signal is provided by any number of components including but not limited to a controller or a sensor.

Variation 8 may include the method as set forth in any of variation 6 or 7 wherein an amount of power loss due to the switching loss of the IGBT, P_switching, is determined by the sum of power loss due to switching transients, or other power losses associated with switching, during the turn-on switching event of the IGBT, P_on, and the power loss due to transients, or other power losses associated with switching, during the turn-off switching event of the IGBT, P_off:

$$P\_switching = P\_on + P\_off.$$

Variation 9 may include the method as set forth in any of variations 6-8 wherein P_on is determined by summing the actual energy of the IGBT turn-on switching event for each switching event, Eon_actual, and multiplying that sum by the fundamental frequency of the motor signal, F_fundamental, where n equals Fsw divided by F_fundamental where Fsw is the switching frequency and the summation is taken from 1 to n over the fundamental period, and if the phase current Ip(n) is going through the diode, use Eon_actual(n)=0:

$$P\_on = \Sigma Eon\_actual(n) * F\_fundamental.$$

Variation 10 may include the method as set forth in any of variations 6-9 wherein the actual energy of the IGBT turn-on switching event, Eon_actual, is determined by multiplying the energy of the IGBT turn-on switching event as provided by a lookup table, Eon_lookup_table, by the quotient of the measured HVDC bus voltage, HVDC_measured, and the HVDC bus voltage, as provided by the lookup table to which Eon_lookup_table corresponds, HVDC_lookup:

$$Eon\_actual = Eon\_lookup\_table * \frac{HVDC\_measured}{HVDC\_lookup}.$$

Variation 11 may include the method as set forth in any of variations 6-10 wherein P_off is determined by summing the actual energy of the IGBT turn-off switching event for each switching event, Eoff_actual, and multiplying that sum by the fundamental frequency of the motor signal, F_fundamental, where n equals Fsw divided by F_fundamental where Fsw is the IGBT switching frequency and the summation is taken from 1 to n over the fundamental period, and if the phase current Ip(n) is going through the diode, use Eoff_actual(n)=0:

$$P\_off = \Sigma Eoff\_actual(n) * F\_Fundamental.$$

Variation 12 may include the method as set forth in any of variations 6-11 wherein the actual energy of the IGBT turn-off switching event, Eoff_actual, is determined by multiplying the energy of the IGBT turn-off switching event as provided by a lookup table, Eoff_lookup_table, by the quotient of the measured HVDC bus voltage, HVDC_measured, and the HVDC bus voltage, as provided by the lookup table to which Eoff_lookup_table corresponds, HVDC_lookup:

$$Eoff\_actual = Eoff\_lookup\_table * \frac{HVDC\_measured}{HVDC\_lookup}.$$

Variation 13 may include a method of determining a temperature rise in an IGBT junction without the use of a dedicated temperature estimation or measurement device by determining the power loss due to conduction loss and switching loss of the IGBT, which may include first multiplying the determined power loss by a measured, sensed or obtained thermal impedance from the IGBT junction to a coolant; and then adding the determined temperature rise of the IGBT junction to a measured, sense or obtained temperature of the coolant to determine the absolute temperature of the IGBT junction.

Variation 14 may include the method as set forth in variation 13 wherein the determination of power loss due to conduction loss of the IGBT, P_conduction, is determined by the sum of the product of the phase current of the corresponding IGBT junction, Ip, saturation voltage of the IGBT junction, Vce_sat, and duty cycle of the IGBT PWM, D, divided by the IGBT switching frequency, Fsw, for each switching event for half of the fundamental cycle, multiplied by the fundamental frequency of the motor signal, F_fundamental where n equals Fsw divided by F_fundamental and the summation is taken from 1 to n over the fundamental period, and if Ip(n) is going through the diode, use Ip(n)=0:

$$P\_conduction = \sum \frac{Ip(n) * Vce_{sat(n)} * D(n)}{Fsw} * F\_fundamental.$$

Variation 15 may include the method as set forth in any of variations 13-14 wherein the phase current of the IGBT junction, Ip, saturation voltage of the IGBT junction, Vce_sat, duty cycle of the IGBT PWM, D, the switching frequency, Fsw, and the fundamental frequency of the motor signal is provided by any number of components including but not limited to a controller or a sensor.

Variation 16 may include the method as set forth in any of variations 13-15 wherein an amount of power loss due to switching loss of the IGBT, P_switching is determined by the sum of power loss due to switching transients, or other losses associated with switching of the IGBT, during the turn-on switching event of the IGBT, P_on, and the power loss due to switching transients, or other losses associated with switching the IGBT, during the turn-off switching event of the IGBT, P_off:

$$P\_switching = P\_on + P\_off.$$

Variation 17 may include the method as set forth in any of variations 13-16 wherein P_on is determined by summing the actual energy of the IGBT turn-on switching for each switching event, Eon_actual, and multiplying that sum by the fundamental frequency of the motor signal, F_fundamental, where n equals Fsw divided by F_fundamental where Fsw is the switching frequency and the summation is taken from 1 to n over the fundamental period and if the phase current Ip(n) is going through the diode, use Eon_actual(n)=0:

$$P\_on = \Sigma Eon\_actual(n) * F\_fundamental.$$

Variation 18 may include the method as set forth in any of variations 13-17 wherein the actual energy of the IGBT turn-on switching event, Eon_actual, is determined by multiplying the energy of the IGBT turn-on switching event as provided by a lookup table, Eon_lookup_table, by the quotient of the measured HVDC bus voltage, HVDC_measured, and the HVDC bus voltage, as provided by the lookup table to which Eon_lookup_table corresponds, HVDC_lookup:

$$Eon\_actual = Eon\_lookup\_table * \frac{HVDC\_measured}{HVDC\_lookup}.$$

Variation 19 may include the method as set forth in any of variations 13-18 wherein P_off is determined by summing the actual energy of the IGBT turn-off switching event for each switching event, Eoff_actual, and multiplying that sum by the fundamental frequency of the motor signal, F_fundamental, where n equals Fsw divided by F_fundamental where Fsw is the switching frequency and the summation is taken from 1 to n over the fundamental period and if phase current Ip(n) is going through the diode, use Eoff_actual(n)=0:

$$P\_off = \Sigma Eoff\_actual(n) * F\_fundamental.$$

Variation 20 may include the method as set forth in any of variations 13-19 wherein the actual energy of the off state of the IGBT, Eoff_actual, is determined by multiplying the energy of the IGBT turn-off switching event as provided by a lookup table, Eoff_lookup_table, by the quotient of the measured HVDC bus voltage, HVDC_measured, and the HVDC bus voltage, as provided by the lookup table to which Eoff_lookup_table corresponds, HVDC_lookup:

$$Eoff\_actual = Eoff\_lookup\_table * \frac{HVDC\_measured}{HVDC\_lookup}.$$

The above description of select variations within the scope of the invention is merely illustrative in nature and, thus, variations or variants thereof are not to be regarded as a departure from the spirit and scope of the invention.

What is claimed is:

1. A method comprising:
providing an electro-mechanical drive system controller;
providing a vehicle comprising an electro-mechanical drive system comprising an IGBT junction wherein the IGBT junction, does not comprise a dedicated temperature estimation or measurement device for estimating or measuring the temperature of the IGBT junction, and wherein the IGBT junction is constructed and arranged so that a temperature rise in the IGBT junction may be determined, without the use of a dedicated temperature estimation or measurement device, by
using the electro-mechanical drive system controller to determine a power loss P_total of the IGBT due to conduction losses P conduction and losses associated with IGBT switching events P_switching, wherein P_total =P_conduction +P_switching;
using the electro-mechanical drive system controller to multiply the determined power loss P_total by a measured, sensed or obtained thermal impedance Rth from the IGBT junction to a coolant, wherein Tj_rise =P_total * Rth; and
using the electro-mechanical drive system controller to add the determined temperature rise Tj_rise of the IGBT junction to a measured, sensed or obtained temperature of the coolant T_coolant to determine an absolute temperature of the IGBT junction Tj, wherein Tj =Tj_rise+T_coolant;
wherein the determination of power loss due to conduction loss of the IGBT, P_conduction, is determined by a sum of a product of a phase current of the corresponding IGBT junction, Ip, saturation voltage of the IGBT junction, Vce_sat, and duty cycle of an IGBT PWM, D, divided by a frequency of a switching signal, Fsw, for each switching period for half of a fundamental period of the switching signal, multiplied by the fundamental frequency of a motor signal, F_fundamental where n equals Fsw divided by f_fundamental and the sum is taken from 1 to n over the fundamental period of the switching signal and if Ip(n) is going through a diode, use Ip(n)=0, wherein $$P\_conduction = \sum \frac{Ip(n) * Vce_{sat(n)} * D(n)}{Fsw} * F\_fundamental$$

and wherein the phase current of the IGBT junction, Ip, saturation voltage of the IGBT junction, Vce_sat, duty cycle of the IGBT PWM, D, the switching frequency, Fsw, and the fundamental frequency of the motor signal is be provided by any number of components including but not limited to a controller or a sensor; and
based upon the absolute temperature of the IGBT junction Tj, using the electro-mechanical drive system controller to induce the electro-mechanical drive system to change a current mode of operation of the vehicle.

2. The method of claim 1 wherein an amount of power loss due to switching loss of the IGBT, P_switching is determined by a sum of power loss due to switching transients of the IGBT, or other losses associated with switching, during turn-on switching events of the IGBT, P_on, and power loss due to switching transients of the IGBT, or other losses associated with switching, during turn-off switching events of the IGBT, P_off, wherein P_switching= P_on +P_off.

3. The method of claim 2 wherein P_on is determined by summing an actual energy of the IGBT turn-on switching events for each switching event, Eon_actual, and multiplying that sum by a fundamental frequency of a motor signal, F_fundamental, where n equals Fsw divided by F_fundamental where Fsw is a frequency of a switching signal and the sum is taken from 1 to n over the fundamental period of the switching signal and if a phase current Ip(n) is going through a diode, use Eon_actual(n)=0, wherein P_on = ΣEon_actual(n) * F_fundamental; and
wherein the actual energy of the IGBT turn-on switching event, Eon_actual, is determined by multiplying the energy of the IGBT turn-on switching event as provided by a lookup table, Eon_lookup_table, by a quotient of a measured HVDC bus voltage, HVDC_measured, and a HVDC bus voltage, as provided by the lookup table to which Eon_lookup_table corresponds, HVDC_lookup, wherein $$Eon\_actual = Eon\_lookup\_table * \frac{HVDC\_measured}{HVDC\_lookup}.$$

4. The method of claim 2 wherein P_off is determined by summing an actual energy of the IGBT turn-off switching event for each switching event, Eoff_actual, and multiplying that sum by a fundamental frequency of a motor signal, F_fundamental, where n equals Fsw divided by F_fundamental where Fsw is a frequency of a switching signal and the sum is taken from 1 to n over a fundamental period of the switching signal and if Ip(n) is going through a diode, use Eoff_actual(n)=0, wherein P_off=ΣEoff_actual(n)*F_fundamental and wherein the actual energy of the IGBT turn-off switching, Eoff_actual, is determined by multiplying an energy of the IGBT turn-off switching event as provided by a lookup table, Eoff_lookup_table, by a quotient of a measured HVDC bus voltage, HVDC_measured, and a HVDC bus voltage, as provided by the lookup table to which Eoff_lookup_table corresponds, HVDC_lookup, wherein $$Eoff\_actual = Eoff\_lookup\_table * \frac{HVDC\_measured}{HVDC\_lookup}.$$

5. A method comprising:
providing an electro-mechanical drive system controller;
providing a vehicle comprising an electro-mechanical drive system comprising an IGBT junction wherein the IGBT junction, does not comprise a dedicated temperature estimation or measurement device for estimating or measuring the temperature of the IGBT junction, and wherein the IGBT junction is constructed and arranged so that a temperature rise in the IGBT junction may be determined, without the use of a dedicated temperature estimation or measurement device, by:

using the electro-mechanical drive system controller to determine a power loss due to conduction losses of the IGBT and losses associated with switching of the IGBT;

using the electro-mechanical drive system controller to multiply the determined power loss by a thermal impedance from the IGBT junction to a coolant; and using the electro-mechanical drive system controller to add the determined temperature rise of the IGBT junction to a measured, sensed or obtained temperature of the coolant to determine an absolute temperature of the IGBT junction;

wherein the determination of power loss due to conduction loss of the IGBT, P_conduction, is determined by a sum of a product of a phase current of the corresponding IGBT junction, Ip, saturation voltage of the IGBT junction, Vce_sat, and duty cycle of an IGBT PWM, D, divided by a frequency of a switching signal, Fsw, for each switching event for half of a fundamental period of the switching signal, multiplied by a fundamental frequency of the motor signal, F_fundamental where n equals Fsw divided by F_fundamental and the summation is taken from 1 to n over the fundamental period of the switching signal and if Ip(n) is going through a diode, use Ip(n)=0, wherein $$\text{P\_conduction} = \sum \frac{Ip(n) * Vce_{sat(n)} * D(n)}{Fsw} * \text{F\_fundamental}$$

and based upon the absolute temperature of the IGBT junction, using the electro-mechanical drive system controller to induce the electro-mechanical drive system to change a current mode of operation of the vehicle.

6. The method of claim 5 where the phase current of the IGBT junction, Ip, saturation voltage of the IGBT junction, Vce_sat, duty cycle of the IGBT PWM, D, the frequency of a switching signal, Fsw, and the fundamental frequency of the motor signal is provided by any number of components including but not limited to a controller or a sensor.

7. The method of claim 5 wherein an amount of power loss due to the switching loss of the IGBT, P_switching, is determined by a sum of power loss due to switching transients of the IGBT, or other losses associated with switching of the IGBT, during turn-on switching events of the IGBT, P_on, and the power loss due to the switching transients of the IGBT, or other losses associated with the switching of the IGBT, during turn-off switching events of the IGBT, P_off, wherein P_switching=P_on +P_off.

8. The method of claim 7 wherein P_on is determined by summing an actual energy of the IGBT turn-on switching event for each switching event, Eon_actual, and multiplying that sum by the fundamental frequency of the motor signal, F_fundamental, where n equals Fsw divided by F_fundamental where Fsw is a frequency of a switching signal and the sum is taken from 1 to n over the fundamental period of the switching signal and if the phase current Ip(n) is going through the diode, use Eon_actual(n)=0, wherein P_on =ΣEon_actual(n)*F_fundamental.

9. The method of claim 8, wherein the actual energy of the IGBT turn-on switching event, Eon_actual, is determined by multiplying an energy of the IGBT turn-on switching event as provided by a lookup table, Eon_lookup_table, by the quotient of the measured HVDC bus voltage, HVDC_measured, and the HVDC bus voltage, as provided by the lookup table to which Eon_lookup_table corresponds, HVDC_lookup, wherein $$\text{Eon\_actual} = \text{Eon\_lookup\_table} * \frac{\text{HVDC\_measured}}{\text{HVDC\_lookup}}.$$

10. The method of claim 7 wherein P_off is determined by summing an actual energy of the IGBT turn-off switching event for each switching event, Eoff_actual, and multiplying that sum by the fundamental frequency of the motor signal, F_fundamental, where n equals Fsw divided by F_fundamental where Fsw is a frequency of a switching signal and the sum is taken from 1 to n over the fundamental period of the switching signal and if the phase current Ip(n) is going through a diode, use Eoff_actual(n)=0, wherein P_off=ΣEoff_actual(n)*F_fundamental.

11. The method of claim 10, wherein the actual energy of the IGBT turn-off switching event, Eoff_actual, is determined by multiplying an energy of the IGBT turn-off switching event as provided by a lookup table, Eoff_lookup_table, by a quotient of a measured HVDC bus voltage, HVDC_measured, and a HVDC bus voltage, as provided by the lookup table to which Eoff_lookup_table corresponds, HVDC_lookup, wherein $$\text{Eoff\_actual} = \text{Eoff\_lookup\_table} * \frac{\text{HVDC\_measured}}{\text{HVDC\_lookup}}.$$

12. A method of determining a temperature rise in an IGBT junction without the use of a dedicated temperature estimation or measurement device by:

providing an electro-mechanical drive system controller;

providing a vehicle comprising an electro-mechanical drive system comprising an IGBT junction wherein the IGBT junction does not include a dedicated temperature estimation or measurement device for determining a temperature change in the IGBT;

using the electro-mechanical drive system controller to determine a power loss due to loss of conduction losses of the IGBT and losses associated with switching the IGBT, comprising:

using the electro-mechanical drive system controller to multiply the determined power loss by a thermal impedance from the IGBT junction to a coolant; and using the electro-mechanical drive system controller to add the determined temperature rise of the IGBT junction to a temperature of the coolant to determine an absolute temperature of the IGBT junction;

wherein an amount of the power losses due to switching losses of the IGBT, P_switching, is determined by a sum of power loss due to a switching transients of the IGBT, or other losses associated with switching the IGBT, during turn-on switching events of the IGBT, P_on, and the power lost due to switching transients of the IGBT, or other losses associated with switching the IGBT, during turn-off switching events of the IGBT, P_off, wherein P_switching =P_on +P_off;

where P_on is determined by summing an actual energy of the IGBT turn-on switching events for each switching event, Eon_actual, and multiplying that sum by a fundamental frequency of the motor signal, F_fundamental, where n equals Fsw divided by F_fundamental where Fsw is a frequency of a switching signal and the sum is taken from 1 to n over the fundamental period of the switching signal and if the phase current Ip(n) is going through a diode, use Eon_actual(n)=0, wherein $$P\_on = \Sigma Eon\_actual(n) * F\_fundamental$$

and based upon the absolute temperature of the IGBT junction, using the electro-mechanical drive system controller to induce the electro-mechanical drive system to change a current mode of operation of the vehicle.

13. The method of claim 12, wherein the determination of power loss due to conduction losses of the IGBT, P_conduction, is determined by a sum of a product of a phase current of the corresponding IGBT junction, Ip, saturation voltage of the IGBT junction, Vce_sat, and duty cycle of an IGBT PWM, D, divided by a frequency of a switching signal, Fsw, for each switching event for half of a fundamental period of the switching signal, multiplied by a fundamental frequency of a motor signal, F_fundamental, where n equals Fsw divided by F_fundamental and the sum is taken from 1 to n over the fundamental period of the switching signal and if Ip(n) is going through a diode, use Ip(n)=0, wherein $$P\_conduction = \sum \frac{Ip(n) * Vce_{sat(n)} * D(n)}{Fsw} * F\_fundamental.$$

14. The method of claim 12, wherein a phase current of the IGBT junction, Ic, saturation voltage of the IGBT junction, Vce_sat, duty cycle of the IGBT junction, D, a frequency of a switching signal, Fsw, and a fundamental frequency of the motor signal is provided by any number of components including but not limited to a controller or a sensor.

15. The method of claim 12, wherein an actual energy of the IGBT turn-on switching event, Eon_actual, is determined by multiplying an energy of the IGBT turn-on switching event as provided by a lookup table, Eon_lookup_table, by a quotient of a measured HVDC bus voltage, HVDC_measured, and a HVDC bus voltage, as provided by the lookup table to which Eon_lookup_table corresponds, HVDC_lookup, wherein $$Eon\_actual = Eon\_lookup\_table * \frac{HVDC\_measured}{HVDC\_lookup}.$$

16. The method of claim 12 wherein P_off is determined by summing an actual energy of the IGBT turn-off switching events for each switching event, Eoff_actual, and multiplying that sum by the fundamental frequency of the motor signal, F_fundamental, where n equals Fsw divided by F_fundamental where Fsw is a frequency of a switching signal and the sum is taken from 1 to n over the fundamental period of the switching signal and if a phase current Ip(n) is going through a diode, use Eoff_actual(n)=0, wherein $$P\_off = \Sigma Eoff\_actual(n) * F\_fundamental.$$

17. The method of claim 16, wherein the actual energy of the IGBT turn-off switching event, Eoff_actual, is determined by multiplying an energy of the IGBT turn-off switching event as provided by a lookup table, Eoff_lookup_table, by a quotient of a measured HVDC bus voltage, HVDC_measured, and a HVDC bus voltage, as provided by the lookup table to which Eoff_lookup_table corresponds, HVDC_lookup, wherein $$Eoff\_actual = Eoff\_lookup\_table * \frac{HVDC\_measured}{HVDC\_lookup}.$$

* * * * *